United States Patent
Polzin et al.

(10) Patent No.: US 12,197,870 B2
(45) Date of Patent: Jan. 14, 2025

(54) BOOTSTRAPPING TOPIC DETECTION IN CONVERSATIONS

(71) Applicant: Solventum Intellectual Properties Company, Maplewood, MN (US)

(72) Inventors: Thomas S. Polzin, Pittsburgh, PA (US); Hua Cheng, Pittsburgh, PA (US); Detlef Koll, Pittsburgh, PA (US)

(73) Assignee: Solventum Intellectual Properties Company, Maplewood, MN (US)

( * ) Notice: Subject to any disclaimer, the term of this patent is extended or adjusted under 35 U.S.C. 154(b) by 211 days.

(21) Appl. No.: 17/906,768

(22) PCT Filed: Mar. 18, 2021

(86) PCT No.: PCT/IB2021/052287
§ 371 (c)(1),
(2) Date: Sep. 20, 2022

(87) PCT Pub. No.: WO2021/209838
PCT Pub. Date: Oct. 21, 2021

(65) Prior Publication Data
US 2023/0153538 A1    May 18, 2023

Related U.S. Application Data

(60) Provisional application No. 63/010,276, filed on Apr. 15, 2020.

(51) Int. Cl.
G06F 40/279    (2020.01)
G06F 16/35     (2019.01)
(Continued)

(52) U.S. Cl.
CPC .............. G06F 40/30 (2020.01); G06F 16/35 (2019.01); G06F 40/166 (2020.01)

(58) Field of Classification Search
CPC ......... G06F 40/20; G06F 40/279; G06F 16/35
See application file for complete search history.

(56) References Cited

U.S. PATENT DOCUMENTS 9,984,772 B2    5/2018  Liu et al.
10,831,793 B2*  11/2020 Aharonov ............... G06F 40/20
(Continued)

OTHER PUBLICATIONS

International Search Report for PCT Application No. PCT/IB2021/052287, mailed on May 4, 2021, 4 pages.

*Primary Examiner* — Daniel Abebe

(57) ABSTRACT

A computer system and method identifies topics in conversations, such as a conversation between a doctor and patient during a medical examination. The system and method generates, based on first text (such as a document corpus including previous clinical documentation), a plurality of sentence embeddings representing a plurality of semantic representations in a plurality of sentences in the training text. The system and method generate a classifier based on the second text, which includes a plurality of sections associated with a plurality of topics, and the plurality of sentence embeddings. The system and method generate, based on a sentence (such as a sentence in a doctor-patient conversation) and the classifier, an identifier of a topic to associate with the first sentence. The system and method may also insert the sentence into a section, associated with the identified topic, in a document (such as a clinical note).

14 Claims, 2 Drawing Sheets

(51) Int. Cl.
*G06F 40/166* (2020.01)
*G06F 40/30* (2020.01)

(56) References Cited

U.S. PATENT DOCUMENTS

| | | | |
|---|---|---|---|
| 10,853,580 B1* | 12/2020 | Amrite | G06N 3/08 |
| 2015/0324065 A1* | 11/2015 | Kaul | G06Q 30/0255 |
| | | | 715/753 |
| 2017/0177715 A1* | 6/2017 | Chang | G06N 5/04 |
| 2019/0155947 A1 | 5/2019 | Chu et al. | |
| 2019/0311271 A1* | 10/2019 | Li | G06F 40/40 |

* cited by examiner

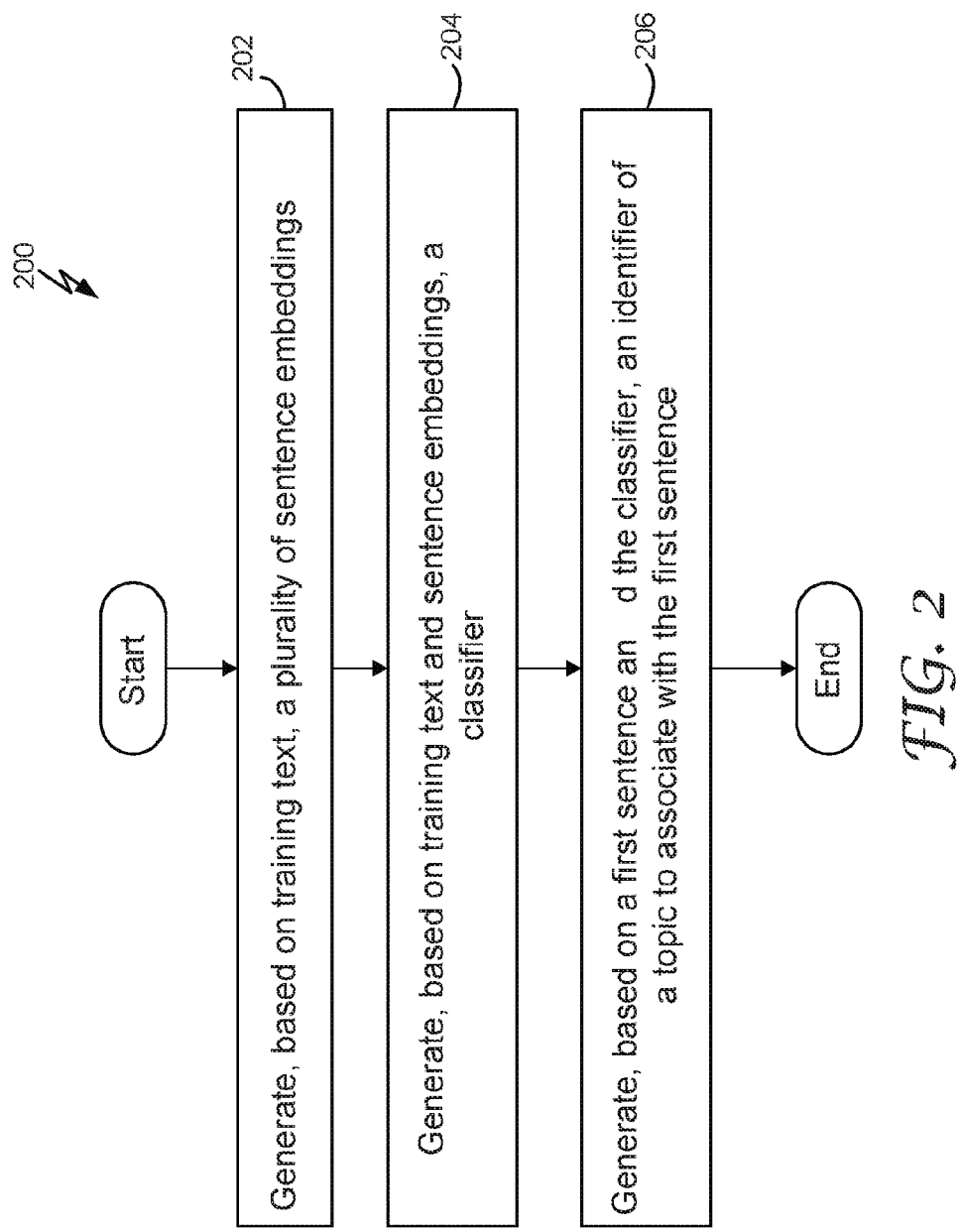

BOOTSTRAPPING TOPIC DETECTION IN CONVERSATIONS

CROSS REFERENCE TO RELATED APPLICATIONS

This application is a national stage filing under 35 U.S.C. 371 of PCT/IB2021/052287, filed Mar. 18, 2021, which claims the benefit of U.S. Application No. 63/010,276, filed Apr. 15, 2020, the disclosure of which is incorporated by reference in its/their entirety herein.

BACKGROUND

An interview between a patient and doctor in a medical examination typically follows a particular sequence of topics. For example, the doctor typically begins by asking the patient to explain what his chief medical complaint is, and to describe when that complaint first surfaced and what the symptoms have been. The doctor then typically asks the patient about his or her current medications, reviews respiration, skin, and eyes, and then inquires about the patient's family members and allergies.

A variety of existing systems receive information about such a doctor-patient conversation (such as the audio of the conversation and/or a transcript of the conversation) and attempt to extract, based on that information, discrete data representing at least some of the doctor-patient conversation. Such discrete data may be stored, for example, in an Electronic Health Record (EHR) and/or other structured document (e.g., a document containing XML tags and/or other metadata tags).

Producing such discrete data requires that the topics in the doctor-patient conversation be detected. This is true regardless of the particular topics covered in the conversation and regardless of the sequence in which those topics are covered in the conversation. Such topic detection typically is performed using a supervised machine learning algorithm that requires vast amounts of training data. Creating such training data typically is very costly and time-consuming.

SUMMARY

A computer system and method identifies topics in conversations, such as a conversation between a doctor and patient during a medical examination. The system and method generates, based on training text (such as a document corpus including previous clinical documentation) which includes a plurality of sections associated with a plurality of topics, a plurality of sentence embeddings representing a plurality of semantic representations in a plurality of sentences in the training text. The system and method generate a classifier based on the training text and the plurality of sentence embeddings. The system and method generate, based on a sentence (such as a sentence in a doctor-patient conversation) and the classifier, an identifier of a topic to associate with the first sentence. The system and method may also insert the sentence into a section, associated with the identified topic, in a document (such as a clinical note).

Other features and advantages of various aspects and embodiments of the present invention will become apparent from the following description and from the claims.

BRIEF DESCRIPTION OF THE DRAWINGS

FIG. 2 is a flowchart of a method performed by the system of FIG. 1 according to one embodiment of the present invention.

DETAILED DESCRIPTION

Figure 1:
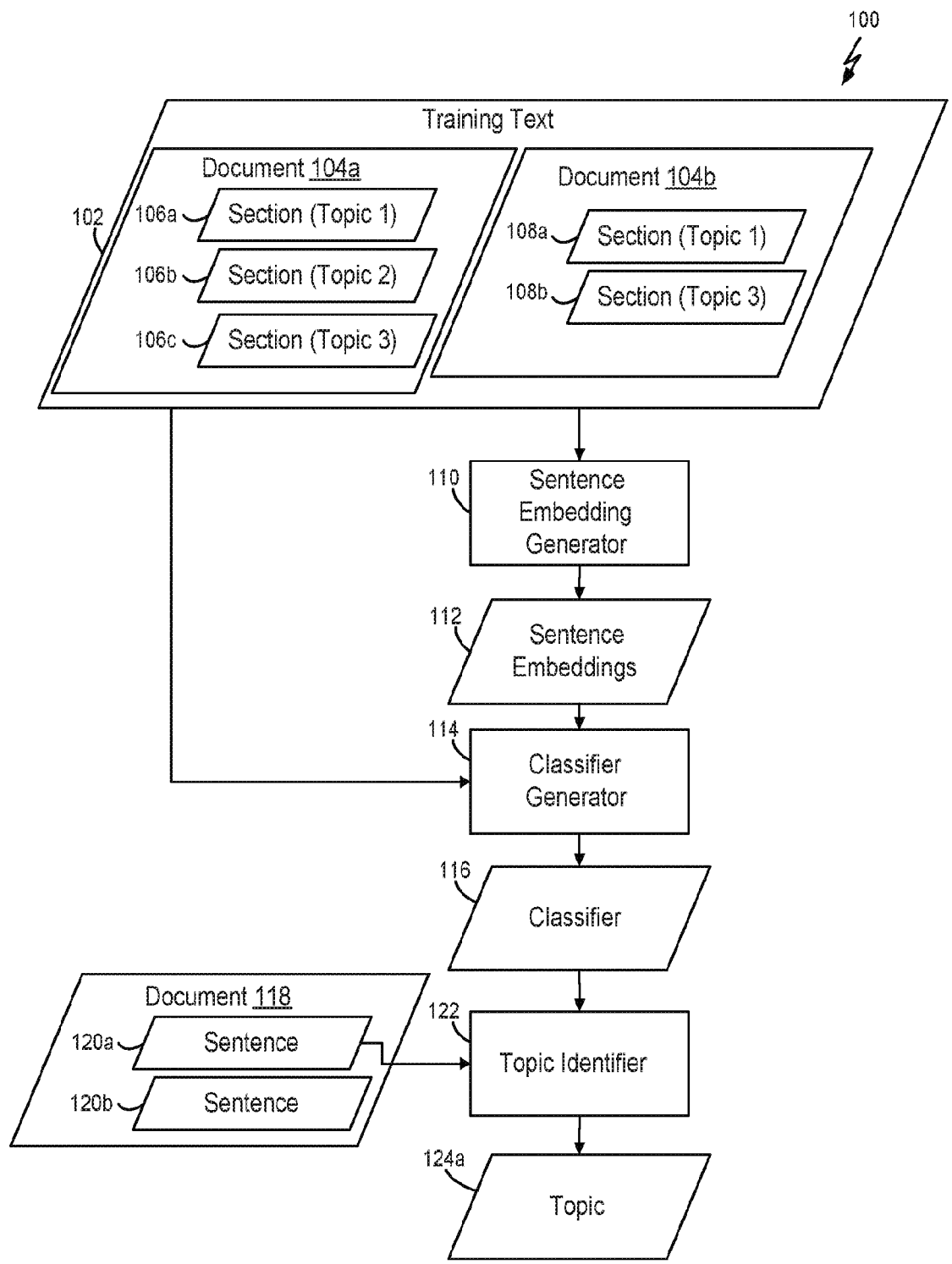
FIG. 1 is a dataflow diagram of a system for automatically identifying a topic associated with a sentence according to one embodiment of the present invention.

In general, embodiments of the present invention are directed to a computer system and method that automatically identifies topics (and associated document sections) associated with sentences, such as sentences in a conversation between two or more people (e.g., a doctor and a patient). Embodiments of the present invention may insert such sentences into the identified sections in a document, such as a clinical note. Embodiments of the present invention may further identify topics (and associated document sections) associated with utterances in the conversation. Embodiments of the present invention can also serve as a filter to remove unimportant or irrelevant content in the conversation and thus help pinpoint content that is most relevant to the current patient visit. Embodiments of the present invention can also help improve the quality of documentation by moving sentences to the sections in which they belong.

As described above, it is known that an interview between a patient and doctor typically follows a particular sequence of topics. For example, the doctor may ask the patient about the patient's current medications, then ask about respiration, skin, eyes, and ears, and inquire about the patient's family members and allergies. To convert the doctor-patient dialog into discrete data (such as discrete data in an Electronic Health Record (EHR) and/or structured document, such as an XML document containing metadata tags), it is necessary to detect the topics associated with the text in the conversation. Topic detection in natural language typically is achieved using a supervised machine learning algorithm that requires vast amounts of training data. Creating such training data is very costly and time-consuming.

Clinical documents (such as those encoded according to the HL7 CDA standard) typically use sections to structure the content of such documents. Although the content in such document sections may differ syntactically very significantly from utterances in doctor-patient conversations, the content still typically represents the same topics as the utterances in the doctor-patient conversations. For example, although a "Current Medications" section in a clinical document may use different sentences to describe the patient's current medications than the utterances in the doctor-patient conversation that was used to generate the sentences in the clinical document, both the sentences in the clinical document and the utterances in the conversation represent the same current medications of the patient.

In general, embodiments of the present invention include systems and methods for building a distributed semantic representation of a sentence (e.g., a sentence embedding). The resulting semantic representation of the sentence is not limited by the particular syntactic idiosyncrasies of the sentence. Embodiments of the present invention train such sentence embeddings on training text, such as a large corpus of existing clinical documents, which contain sections that act as labels of text corresponding to a plurality of topics in the clinical documents. Embodiments of the present invention may then train an additional classifier to predict, based on a given sentence embedding, the topic (and corresponding document section) to which the sentence embedding corresponds. Embodiments of the present invention may insert a sentence represented by the sentence embedding into the predicted document section.

Embodiments of the present invention may use the same classifier to predict, based on a given utterance in a conversation (e.g., a conversation between a doctor and patient), the topic (and corresponding document section) to which the utterance corresponds.

One advantage of embodiments of the present invention is that they do not rely on vast amounts of training data derived from doctor-patient conversations, but instead may use data that is already available in the form of clinical documents. Although the syntax of the sentences in such clinical documents may vary widely, the semantics of the sentences in the same sections of each document typically are very similar to each other. For example, the semantics of the "Current Medications" sections of a plurality of documents typically are very similar to each other. As a result, the sentence embeddings that are trained on such document sections can be expected to accurately represent the semantics of those document sections, and therefore to be useful in predicting the topics (and corresponding document sections) of new sentences.

Having described various embodiments of the present invention at a high level of generality, certain embodiments of the present invention will now be described in more detail. Referring to FIG. 1, a dataflow diagram is shown of a system 100 for automatically identifying a topic associated with a sentence according to one embodiment of the present invention. Referring to FIG. 2, a flowchart is shown of a method performed by the system 100 of FIG. 1 according to one embodiment of the present invention.

The system 100 includes training text 102. The training text 102 may take any of a variety of forms. In the particular example of FIG. 1, the training text 102 includes a plurality of documents 104a-b. Although only two documents 104a-b are shown in FIG. 1 for ease of illustration, in practice there may be thousands, millions, or more documents in the training text 102. Each of the documents 104a-b contains one or more sections. In the particular example of FIG. 1 and for ease of illustration, the document 104a includes a first section 106a corresponding to a first topic, a second section 106b corresponding to a second topic, and a third section 106c corresponding to a third topic; the second document 104b includes a first section 108a corresponding to the first topic and a second section 108b corresponding to the third topic.

The particular number of sections shown in the documents 104a-b is merely an example and does not constitute a limitation of the present invention. More generally, any document in the training text 102 may include any number of sections corresponding to any topic(s). Each section in the documents 104a-b may contain, for example, one or more sentences and/or other text. The term "text" herein should be understood to refer to plain text, structured text (e.g., text with corresponding metadata tags, such as XML tags), or any combination thereof.

Furthermore, as illustrated by the example in FIG. 1, a section in one document may correspond to the same topic as a section in another document. For example, section 106a in document 104a corresponds to the same topic as section 108a in document 104b. Similarly, section 106c in document 104a corresponds to the same topic as section 108b in document 104b. Two sections that correspond to the same topic (such as sections 106a and 108a, or sections 106c and 108b) may include text (e.g., sentences) that have the same or similar semantic content.

The topic that corresponds to a particular section may be represented by data in the system 100. Such data may be stored, for example, in the same document as the particular section. As a particular example, the document may include metadata (e.g., one or more XML tags) that indicate the topic that corresponds to the particular section. For example, document 104a may include data representing the topic that corresponds to section 106a.

The topic that corresponds to a particular section need not, however, be represented explicitly by any data in the system 100. Alternatively, for example, the topic that corresponds to a particular section may be implicit and not be represented explicitly by data (e.g., metadata tags) in the system 100.

The system 100 also includes a sentence embedding generator 110. The sentence embedding generator 110 generates, based on the training text 102, a plurality of sentence embeddings 112 representing a plurality of semantic representations of a plurality of sentences in the training text 102 (FIG. 2, operation 202). More generally, the sentence embedding generator 110 may generate the sentence embeddings 112 based on any text, which may or may not include the training text 102. For example, the sentence embedding generator 110 may generate the sentence embeddings 112 based on one or both of: (1) the training text 102; and (2) text other than the training text 102, such as transcripts of conversations and other documents. Some or all of the text that is used by the sentence embedding generator 110 to generate the sentence embeddings 112 may not include sections. The sentence embedding generator 110 may, for example, generate, in the sentence embeddings 112, a single sentence embedding corresponding to each of the sentences in the text that the sentence embedding generator 110 uses to generate the sentence embeddings 112. The sentence embeddings 112 are constructed from word embeddings and character embeddings, such that sentences with similar meanings but different syntaxes are close to each other in a high-dimensional space.

The system 100 also includes a classifier generator 114, which generates, based on the training text 102 and the plurality of sentence embeddings 112, a classifier 116 (FIG. 2, operation 204).

The system 100 also includes a document 118, which may be a document that is not part of the training text 102. The system 100 also includes a topic identifier 122, which generates, based on a first sentence (such as sentence 120a in document 118) and the classifier 116, an identifier 124a of a topic to associate with the first sentence (FIG. 2, operation 206).

Although not shown in FIGS. 1 and 2, the system 100 and method 200 may insert the first sentence (e.g., sentence 120a) into a first section of a first document (which may be distinct from the document 118), where the first section is associated with the identified topic 124a.

The system 100 and method 200 may repeat some or all of the method 200 described above for one or more additional sentences. For example, the topic identifier 122 may generate, based on a second sentence 120b in the document 118 and the classifier 116, an identifier (not shown) of a second topic to associate with the second sentence 120b. The system 100 and method 200 may insert the second sentence 120b into a second section of the first document, where the second section is associated with the identified second topic. The same process may be repeated for any number of sentences.

The system 100 and method 200 may similarly identify topics and corresponding sections for utterances. For example, the topic identifier 122 may receive an utterance (such as an utterance in a doctor-patient conversation) and, based on the utterance and the classifier 116, generate an identifier of a topic to associate with the utterance. For example, the utterance may be transcribed into text, and embodiments of the present invention may then process that text in any of the ways disclosed herein.

The system 100 and method 200 may operate in real-time. For example, the system 100 and method 200 may use techniques disclosed herein to: (1) generate a first identifier of a first topic to associate with a first sentence in the document 118; (2) associate the first topic with the first sentence; and (3) insert the first sentence into a first section of the first document, where the first section is associated with the first topic. The system 100 and method 200 may also use techniques disclosed herein to: (4) generate a second identifier of a second topic to associate with a second sentence in the document 118; (5) associate the second topic with the second sentence; and (6) insert the second sentence into a second section of the first document, where the second section is associated with the second topic. Operation (3) may be performed before one or more of operations (4), (5), and (6). As this example illustrates, the first sentence in the document 118 may be inserted into the first document before some or all processing is performed on a second sentence in the document 118. As this implies, generation of classifiers for multiple sentences in the document 118, and generation of topics for such sentences, does not need to be completed before sentences may be inserted into the first document.

As another example, at least some of the operations disclosed herein may be performed in parallel with each other. For example, classifiers may be generated in parallel with inserting sentences into the first document. As another example, topics may be generated in parallel with inserting sentences into the first document. For example, operation (4) above may be performed in parallel with one or more of operations (1), (2), and (3). As another example, operation (5) above may be performed in parallel with one or more of operations (1), (2), and (3). As another example, operation (6) above may be performed in parallel with one or more of operations (1), (2), and (3).

Sentences may occur in a particular sequence in the document 118, but be inserted into the first document in a sequence that differs from the particular sequence in the document 118. Consider an example in which the second sentence 120b occurs at a position that is after (either immediately after or at some point after) sentence 120a in the document 118. The method 100 and system 200 may insert the first sentence 120a at a first position in the first document, and may insert the second sentence 120b at a second position in the first document. Although the first position may be before (either immediately before or at some point before) the second position, alternatively the first position may be after (either immediately after or at some point after) the second position. As this explanation illustrates, the first and second sentence may be ordered in a sequence in the document 118 that differs from the sequence in which the first and second sentence are ordered into the first document. This may be because, for example, the speaker speaks the first and second sentence in a different sequence than that in which their corresponding topics occurs in the first document.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the training text 102 may include millions (or more) of documents, which the sentence embedding generator 110 may use to generate sentence embeddings 112. It would be impossible or impractical for a human to generate such sentence embeddings 112 mentally or manually in a sufficiently short amount of time to be useful. As a result, this is an example of a functions which is inherently computer-implemented and which could not be performed manually or mentally by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A method, for identifying a first topic represented by a first sentence, performed by at least one computer processor executing computer program instructions stored on at least one non-transitory computer readable medium, the method comprising:
   (A) generating, based on first text, a plurality of sentence embeddings representing a plurality of semantic representations of a plurality of sentences in the training text;
   (B) generating, based on second text and the plurality of sentence embeddings, the second text comprising a plurality of sections associated with a plurality of topics, a classifier;
   (C) generating, based on the first sentence and the classifier, a first identifier of the first topic to associate with the first sentence; and
   (D) inserting the first sentence into a first section of a first document, the first section being associated with the first topic.

2. The method of claim 1, further comprising:
   (E) generating, based on a second sentence and the classifier, a second identifier of a second topic to associate with the second sentence.

3. The method of claim 2, further comprising:
   (F) inserting the second sentence into a second section of the first document, the second section being associated with the second topic.

4. The method of claim 1:
   wherein the second text comprises a plurality of documents;
   wherein the plurality of documents comprises a first document comprising a first section in the plurality of sections, wherein the first section is associated with a first one of the plurality of topics; and
   wherein the plurality of documents comprises a second document comprising a second section in the plurality of sections, wherein the second section is associated with the first one of the plurality of topics.

5. The method of claim 4:
   wherein the first document comprises a third section in the plurality of sections, wherein the third section is associated with a second one of the plurality of topics; and
   wherein the second document comprises a fourth section in the plurality of sections, wherein the fourth section is associated with the second one of the plurality of topics.

6. The method of claim 1, further comprising:
   (E) generating, based on the classifier and data representing an utterance, an identifier of a topic to associate with the utterance.

7. The method of claim 1, wherein the first text includes the second text.

8. A system comprising a non-transitory computer-readable medium having computer-readable instructions stored thereon, wherein the computer-readable instructions are executable by at least one computer processor to perform a method for identifying a first topic represented by a first sentence, the method comprising:
   (A) generating, based on first text, a plurality of sentence embeddings representing a plurality of semantic representations of a plurality of sentences in the training text;
   (B) generating, based on second text and the plurality of sentence embeddings, the second text comprising a plurality of sections associated with a plurality of topics, a classifier;
   (C) generating, based on the first sentence and the classifier, a first identifier of the first topic to associate with the first sentence; and
   (D) inserting the first sentence into a first section of a first document, the first section being associated with the first topic.

9. The system of claim 8, wherein the method further comprises:
   (E) generating, based on a second sentence and the classifier, a second identifier of a second topic to associate with the second sentence.

10. The system of claim 9, wherein the method further comprises:
    (F) inserting the second sentence into a second section of the first document, the second section being associated with the second topic.

11. The system of claim 8:
    wherein the second text comprises a plurality of documents;
    wherein the plurality of documents comprises a first document comprising a first section in the plurality of sections, wherein the first section is associated with a first one of the plurality of topics; and
    wherein the plurality of documents comprises a second document comprising a second section in the plurality of sections, wherein the second section is associated with the first one of the plurality of topics.

12. The system of claim 11:
    wherein the first document comprises a third section in the plurality of sections, wherein the third section is associated with a second one of the plurality of topics; and wherein the second document comprises a fourth section in the plurality of sections, wherein the fourth section is associated with the second one of the plurality of topics.

13. The system of claim 8, wherein the method further comprises:
(E) generating, based on the classifier and data representing an utterance, an identifier of a topic to associate with the utterance.

14. The system of claim 8, wherein the first text includes the second text.

* * * * *